April 28, 1959 — M. W. ZUG — 2,883,713
PORTABLE FOLDABLE CABIN
Filed Sept. 30, 1957 — 2 Sheets-Sheet 1
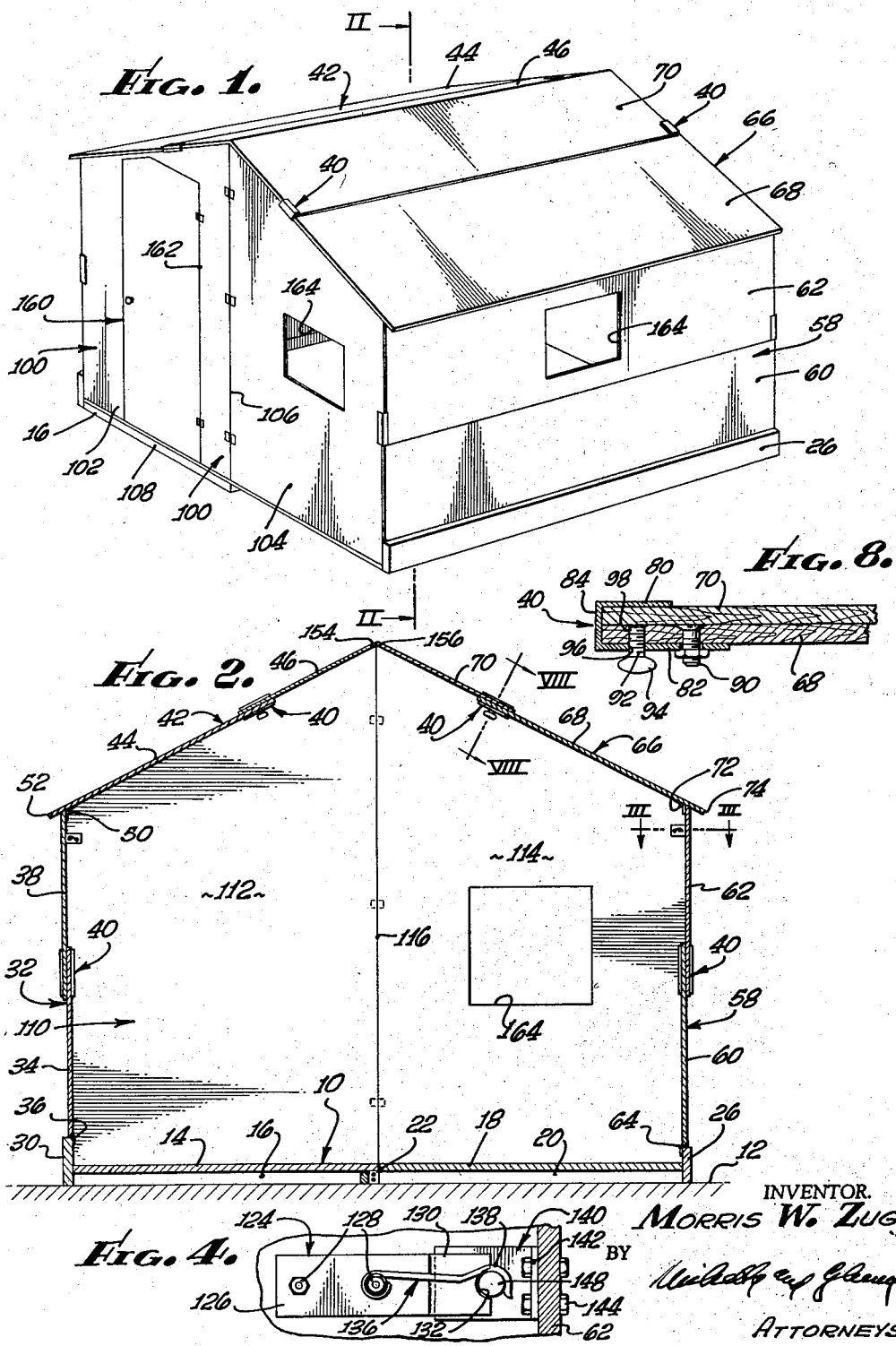
INVENTOR.
MORRIS W. ZUG,
BY
ATTORNEYS.

April 28, 1959 M. W. ZUG 2,883,713
PORTABLE FOLDABLE CABIN
Filed Sept. 30, 1957 2 Sheets-Sheet 2
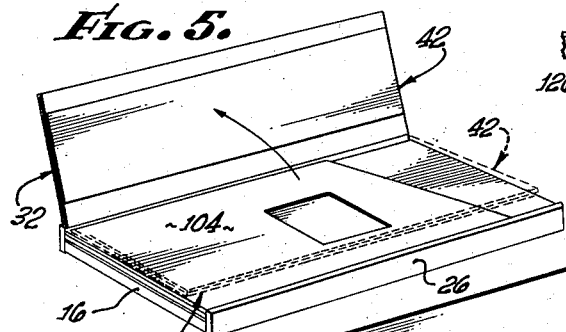
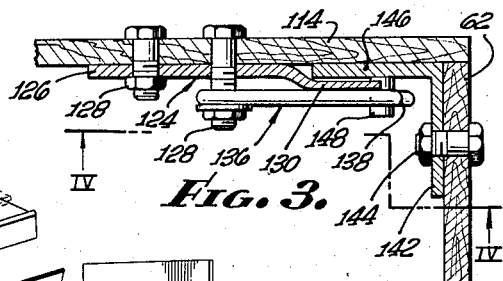
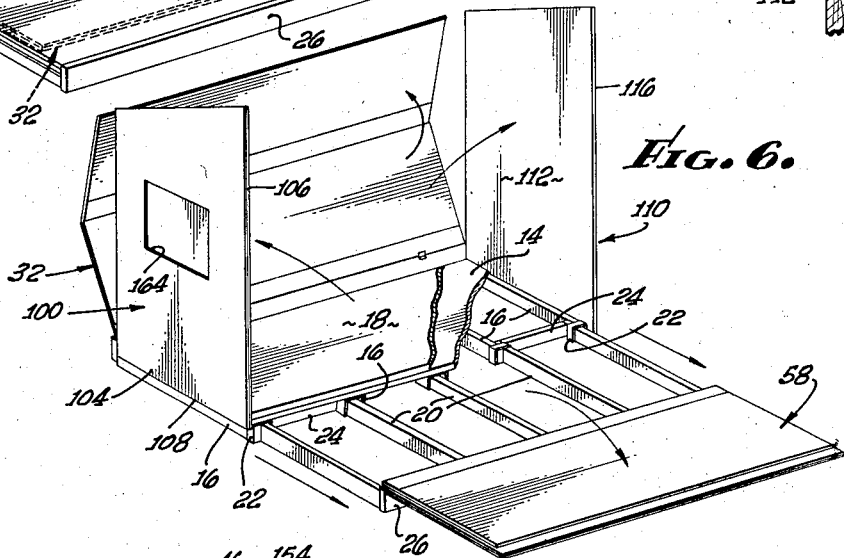
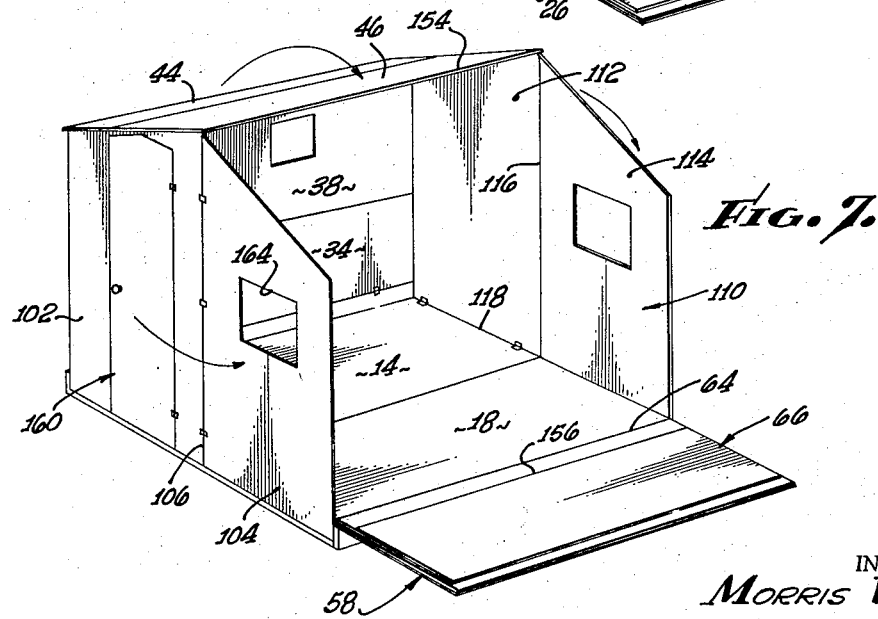
INVENTOR.
MORRIS W. ZUG,
BY
ATTORNEYS.

United States Patent Office 2,883,713
Patented Apr. 28, 1959

2,883,713

PORTABLE FOLDABLE CABIN

Morris W. Zug, Torrance, Calif., assignor to Luward Corporation, Los Angeles, Calif., a corporation of California Application September 30, 1957, Serial No. 687,144

6 Claims. (Cl. 20—2)

This invention relates generally to a small cabin or similar shelter and particularly describes such a structure wherein the major component elements are in articulated relation with one another as by hinged or pivotal connections, and the component elements so connected together are of a substantially uniform size whereby the entire structure can be compactly arranged for storage or transportation when not in use as a shelter. The device may be made of any light weight sheet material having adequate structural strength, such as plywood, light metal or the like.

In its preferred form hereinafter shown and described, the structure of the present invention includes a floor made up of two floor sections, one fixed and the other movable and by preference, of the same size and shape. The fixed floor section is provided on its lower surface with a number of laterally extending support stringers or sills, and a plurality of laterally slidable support sills for the movable floor section. The latter sills may be withdrawn laterally into operative position and the movable floor section, consisting of a rectangular sheet of relatively rigid material such as plywood or the like, may then be laid upon the movable sills thus withdrawn. The outer ends of the movable sills are desirably connected by a longitudinally extending header, and means are provided carried by the fixed floor section for limiting outward movement of the movable sills such that the header fixed to the movable sills is spaced from the edge of the fixed floor section by the width of the movable floor section.

A side wall is hingedly attached along its lower edge to the upper edge of the movable sill header, and a roof section is hingedly attached along or adjacent one side edge to the side wall along the edge opposite to that of the hinge attachment to the header. Desirably, the side wall and roof section is each made up of two relatively slidable panels so that the minimum width of the wall and of the roof when in collapsed position is no greater than, and preferably somewhat less than, the width of one of the floor sections, thereby permitting the side wall and roof to be folded upon one of the floor sections, whereas the side wall and roof section can be extended in width in operative position. A second side wall is hingedly connected along its bottom edge to the edge of the fixed floor section distant from the movable sill header, and a second roof section is hingedly attached along or adjacent one side edge to the second side wall along the edge opposite the hinged attachment edge with the fixed floor section. Front and rear end walls are hingedly attached to opposite end edges of the fixed floor section, each of the end walls including a primary panel hingedly connected to the floor and a secondary panel hingedly connected to the primary panel along an axis perpendicular to the primary panel-floor axis. A suitable entrance door may be formed in one of the end wall panels, preferably the primary panel, for swinging about a vertical axis when the structure is assembled. Suitable connection members, preferably hand actuable, serve to retain the structure in assembled condition.

By the structure briefly described above, it will be seen there is provided in accordance with the present invention a structure which is readily assembled and disassembled and is characterized by the fact that all of the component elements thereof, with the exception of the moveable floor section panel, are hingedly or otherwise attached, either directly or indirectly, to a single fixed floor section. As will be later understood, all of the component structural elements are collapsible into a size no greater than that of the fixed floor section, and thus by choosing a size of this section of, say, four feet by eight feet, the entire structure in compact form occupies a space of four by eight feet in area by about ten to twelve inches in depth.

Accordingly, it is a principal object of the present invention to provide a novel foldable and portable cabin or similar shelter. Additional objects of the invention are to disclose such a structure including a floor having a fixed floor section provided with a plurality of laterally extendable support stringers or sills on which a movable floor section can be placed to effectively double the floor area of the structure; to disclose such a structure in which side walls are hingedly, foldably attached to the floor and each side wall includes a pair of laterally extensible panels whereby to enlarge the side walls beyond their compact form; to disclose such a structure in which roof sections are hingedly connected to said walls, the roof sections being made up of relatively slidable roof panels whereby to permit their extension into operative position and their telescoping into a relatively narrow width when the device is in collapsed, inoperative condition; to provide a structure of the above characteristics including front and rear end walls, each made up of a pair of panels hinged about a vertical axis, one panel of each end wall being hingedly attached to an end edge of the fixed floor section; to disclose a structure of the above nature which is remarkably compact when collapsed into compact condition and which may be readily assembled into operative position when desired; and for other and additional objects and purposes as will be understood from a study of the following description of a preferred embodiment of the invention, taken in connection with the accompanying drawings, in which:

Fig. 1 is a perspective view of a cabin in accordance with the present invention shown in assembled condition.

Fig. 2 is a transverse sectional view taken on line II—II of Fig. 1.

Fig. 3 is a fragmentary sectional view on an enlarged scale taken on line III—III of Fig. 2 showing a preferred form of latching or locking means for retaining the component members in assembled relation.

Fig. 4 is a fragmentary sectional view on an enlarged scale taken on line IV—IV of Fig. 3.

Fig. 5 is a perspective view of the cabin in collapsed position, one side wall and roof section being shown unfolded preparatory to assembly in solid lines and in folded compact position in dotted outline.

Fig. 6 is a perspective view of the device during assembly showing the movable sills of the floor drawn outwardly into operative position, the side wall and roof section hinged thereto being shown partially unfolded, and the two end walls being shown partially unfolded in upright position; portions of the movable and fixed floor sections are broken away.

Fig. 7 is a perspective view showing half of the cabin in fully assembled position showing half roof section of the other half ready to be unfolded into assembled position.

Fig. 8 is a sectional view on an enlarged scale taken on line VIII—VIII of Fig. 2 showing a preferred form of clamping means for retaining side wall panels and roof panels in desired relative positions.

Referring now in detail to the drawings, there is shown in Fig. 1 a fully assembled cabin embodying the present invention. As best seen in Fig. 2 the cabin includes a floor indicated generally at 10 supported by longitudinally spaced, laterally extending sills resting upon the ground or other supporting surface 12. The floor is made up of a fixed floor section 14 of rectangular shape and its supporting sills 16 (see Fig. 2) are fixed to the lower surface thereof. The floor includes also a movable floor section 18 which desirably consists of a rectangular piece of relatively rigid sheet material such as plywood, light metal or the like, having the same size and shape as the floor section 14. The movable floor section 18 is supported upon a number of movable sills 20 (see Fig. 6), each of which is slightly longer than the fixed sills 16 and is slidably carried adjacent one of the fixed sills. Means are provided for thus slidably carrying the movable sills 20 and such means are here shown as including metal straps 22, one of which is fixed to the end of each of the fixed sills 16, each strap including a loop portion encircling a movable sill to permit sliding movement of the latter. A cross-bar 24 extends between and is fixed to the inner ends of certain adjacent pairs of movable sills 20 and serves as a stop means limiting outward movement of the movable sills, since it abuts the inner edges of the loop straps 22 when the movable sills 20 are slid outwardly to their maximum extent, as seen in Fig. 6. Desirably the two movable sills 20 shown at the left in Fig. 6 are similarly provided with a cross-bar 24 extending therebetween at their inner ends to serve as a stop means for them. The outer ends of the movable sills 20 are fixed to a movable header 26 extending longitudinally the entire length of the cabin so that all of the movable sills 20 are withdrawn simultaneously into the operative position seen in Figs. 2 and 6. Header 26 extends above sills 20 and floor 18 to facilitate folding of the components, as will be later understood.

Along the left side of the structure as seen in Fig. 2, there is provided a fixed header 30 extending somewhat higher than movable header 26 and attached to the ends of the fixed sills 16 and to the fixed floor section proper 14. A left side wall indicated generally at 32 includes a lower wall panel 34 hingedly attached along the upper edge of the fixed header 30 for swinging about axis 36. Wall 32 includes also an upper panel 38 and clamping means indicated generally at 40 for slidably carrying the two wall panels 34 and 38 and permitting selective locking of the panels in desired relative position. A roof section indicated generally at 42 includes a lower roof panel 44 and an upper roof panel 46 as well as clamping means 40 of the type previously referred to in the side 32. The lower roof panel 44 is hingedly connected to the upper edge of the upper side wall panel 38 for swinging about axis 50, which is by preference spaced inwardly from the lowermost edge 52 of the lower roof panel as shown in order to provide an overhanging eave when the structure is assembled as seen in Fig. 2.

The right side wall and roof section as seen in Fig. 2 are similar in major respects to the left side wall and roof section just described. The right side wall indicated generally at 58 includes lower wall panel 60 and upper wall panel 62 joined by clamping means 40, the lower edge of the lower panel 60 being hingedly connected to the upper edge of header 26 for swinging about a horizontal axis 64. The right roof section indicated generally at 66 includes a lower roof panel 68 and an upper roof panel 70 connected by clamping means 40, the lower roof panel 68 being hingedly connected to the upper side wall panel 62 for swinging about the axis 72 at the upper edge of the side wall panel 62 and desirably spaced inwardy from the outer edge 74 of the roof panel 68.

The clamping means 40 heretofore referred to and used in the side wall and roof sections is shown in detail in Fig. 8. As there shown, the clamp includes a rigid metal strap formed in chanel shape and having an upper arm 80, a lower arm 82 and a central yoke 84, the arms 80 and 82 being parallel and defining therebetween a channel of sufficient width to accommodate edge portions of two relatively slidable panels.

In the present illustration such panels are the lower roof panel 68 and the upper roof panel 70, and the clamp 40 is fixed to the lower roof panel 68 by suitable fastening means 90. Tightening means 92 are provided, preferably in the form of a set screw having an enlarged outer end 94 to be grasped conveniently by the fingers and a shank threadedly engaging a bore 96 formed in the lower arm 82 of the clamp and passing through an opening 98 in panel 68. It will be seen that tightening of the member 92 by rotation of the handle 94 causes the two roof panels 68 and 70 to be retained in any desired relative relationship.

The structure of the present invention includes front and rear end walls hingedly attached to opposite end edges of the fixed floor section 14. The front end wall is indicated generally at 100 and includes a primary panel 102 and a secondary panel 104, the panels being hingedly connected along their adjoining edges for swinging of the secondary panel 104 about the axis 106 relative to the primary panel 102. The primary panel 102 is hingedly connected along the front edge of the fixed floor section 14 for swinging about a horizontal axis 108 at the end of the floor section. The rear end wall is indicated generally at 110 and includes a primary panel 112 and a secondary panel 114 (see Fig. 7) the two panels being hingedly connected along the adjoining edges for swinging of the secondary panel relative to the primary panel about the axis 116. The primary panel 112 is hingedly connected along its lower edge to the rear edge of the fixed floor section 14 for swinging about the horizontal axis 118.

Suitable fastening means are provided for selectively latching or connecting the end walls 100 and 110 to the side walls and roof sections when the present device is in assembled position. Such means may take any suitable form and a preferred embodiment of the means is seen in Figs. 3 and 4. A metal strap indicated generally at 124 includes a flat base 126 connected to the end panel 114 by bolt means 128, and an integral offset portion 130 spaced from the wall panel 114 and including at its outer end a concave configuration 132 (see Fig. 4). A hook indicated generally at 136 includes a shank pivotally mounted upon one of the bolts 128 and an outer hook portion 138. The side wall panel 62 has affixed thereto an angle member indicated generally at 140 and preferably of metal including an arm 142 fixed by suitable bolt means 144 to the side wall panel 62 and a projecting arm 146 carrying near its outer end a stud 148 adapted to be partially encircled by the hook portion 138 of the member 136 when the parts are in assembled relation as shown. The stud 148 is partially received in the concavity 132 so that the parts are retained in rigid relationship when assembled. It will be readily understood that the mounting of the component parts of the fastening means may be reversed if desired, with the metal strap 124 mounted upon a side wall panel and the angle member 140 mounted upon an end panel. The distal edges 154 and 156 of roof panels 46 and 70, respectively, may be retained together in assembled relation by similar fastening means.

An access door indicated generally at 160 may be formed in an opening in an end wall, preferably in one of the primary panels of such end wall. In the present illustration, the door 160 is hingedly connected to the primary panel 102 of the front end wall for swinging about axis 162, parallel to the axis 106 around which the secondary panel 104 is swingingly connected to panel 102. Suitable window openings may be formed in wall sections as desired, such as those indicated at 164.

Assembly of the present structure from collapsed position into operative position may be readily understood by a comparison of Figs. 5, 6 and 7 in the light of the foregoing description of the components of the present device. In Fig. 5, the structure is shown in compact collapsed position except that the side wall 32 and its hingedly attached roof section 42 are shown in solid lines unfolded from their collapsed position shown in dotted outline parallel to the floor 10. The front end wall 100 may now be raised to its operative position as seen in Fig. 6 and the rear end wall 110 then swung upwardly to its operative position also. The movable floor sills 20 with the attached header 26 and the hingedly connected side wall 58 and roof section 66 may now be drawn downwardly and to the right as seen in Fig. 6 into the operative position for the floor as shown. The movable floor section 18, consisting of a rectangular piece of sheet material and not directly connected to the other components of the present structure, is normally carried in compact position upon the fixed floor 14, and the movable floor section 18 may now be placed from its position of Fig. 6 to its assembled position upon the movable stringers 20, as seen in Fig. 7. The side wall 32 and its connected roof section 42 are extended into operative positions by withdrawing their relatively slidable panels to maximum extent and are assembled to the primary end panels 102 and 112 as shown in Fig. 7. The secondary end panels 104 and 114 are swung outwardly through angles of 180° to assume coplanar relationship with their primary panels 102 and 112, respectively, and the side wall 58 and roof section 56 may then be extended by relative movement of their component panels and raised into assembled relation as seen in Fig. 1. Disassembly of the structure into its compact, inoperative position is accomplished by the reverse sequence to the operations just described for assembly. It is to be noted that the roof sections 42 and 66 swing through angles of less than 180° relative to their respective side walls 32 and 58, so that the outer edges 52 and 74 of the respective roof sections may project outwardly to form eaves as previously described.

Accordingly it will be seen that there is here provided a shelter which may be readily assembled and disassembled and, when in compact disassembled form, occupies very small space for storage or transportation. Since the end walls are made up of a pair of hingedly connected end wall panels, the secondary panel of an end wall may be omitted and a pair of shelters in accordance with the present invention erected together to permit a certain degree of privacy but at the same time permit a passageway from one such cabin into the next. If desired, one end wall of each of two cabins may be omitted entirely, and the two cabins then joined with their open ends together to form a single cabin twice as long as one and enclosing a common area.

Although the structural elements have been shown and described herein principally as made of wood, nevertheless it will be obvious that other materials are within the contemplation of the invention and may be substituted for wood, such as light metal sheets and the like. Modifications and changes in addition to those hereinabove suggested will occur to those skilled in the art and are intended to be embraced within the scope of the appended claims.

I claim:

1. In a portable foldable cabin, in combination: a generally rectangular floor; a side wall including a lower panel hingedly attached along its lower end to a longitudinal edge of said floor, an upper panel, means connecting said panels for permitting the upper panel to slide laterally of the lower panel and means for selectively locking said panels in desired relation; a roof section including a lower roof panel hingedly connected adjacent its lower edge to the upper edge of the upper side wall panel, an upper roof panel, means connecting said roof panels for permitting relative lateral sliding movement thereof and means for selectively locking the roof panels in desired relation; and means for supporting the side wall in upright orientation perpendicular to the floor and for supporting said roof projecting angularly upwardly from the side wall.

2. The invention as stated in claim 1 wherein, in collapsed position, said side wall is folded downwardly to lie virtually parallel to the floor and the roof section is folded beneath the wall.

3. The invention as stated in claim 1 including an end wall panel having its lower edge hingedly connected to an end edge of said floor for swinging movement between a collapsed position virtually parallel to the floor and an operative position projecting perpendicularly thereto, said end wall panel constituting said supporting means.

4. The invention as stated in claim 1 including a plurality of sills laterally slidably carried by said floor and retractable therebeneath when in collapsed position, an elongated header fixed to the ends of said sills opposite said hinged connection to said side wall, and means limiting outward movement of said sills and header.

5. A foldable cabin comprising: a floor having a fixed rectangular floor section of a predetermined width and a movable rectangular floor section of said predetermined width, the movable floor section including a longitudinally extending header along its outer edge, the movable floor section adapted, when in operative position, to lie adjacent the fixed floor section in side-by-side coplanar relation to form a floor having a width twice said predetermined width; a first rectangular side wall hingedly attached along the outer longitudinal edge of the fixed floor section distant from the movable floor section for swinging about a horizontal axis from a collapsed position overlying and parallel to the floor to an operative position extending vertically upward therefrom; a first rectangular roof section hingedly attached adjacent its one longitudinal edge to the edge of said first side wall opposite the floor-hinged edge for swinging about a horizontal axis from a collapsed position virtually parallel to the floor to an operative position extending angularly upwardly from the side wall; a second rectangular side wall hingedly attached to the header of the movable floor section for swinging about a horizontal axis from a collapsed position overlying and parallel to the floor to an operative position extending vertically upwardly therefrom, each of said side walls including laterally movable side wall panels and means for selectively locking said panels in collapsed compact relation or in extended operative relation; a second rectangular roof section hingedly attached adjacent its one longitudinal edge to the edge of said second side wall opposite the header-hinged edge for swinging about a horizontal axis from a collapsed position virtually parallel to the floor to an operative position extending angularly upwardly from the second side wall; and means for connecting the distal edges of the roof sections together and for maintaining said side walls in vertical orientation.

6. A foldable cabin comprising: a floor having a fixed rectangular floor section of a predetermined width and a movable rectangular floor section of said predetermined width, the movable floor section including a longitudinally extending header along its outer edge, the movable floor section adapted, when in operative position, to lie adjacent the fixed floor section in side-by-side coplanar relation to form a floor having a width twice said predetermined width; a first rectangular side wall hingedly attached along the outer longitudinal edge of the fixed floor section distant from the movable floor section for swinging about a horizontal axis from a collapsed position overlying and parallel to the floor to an operative position extending vertically upward therefrom; a first rectangular roof section hingedly attached adjacent its one longitudinal edge to the edge of said first side wall opposite the floor-hinged edge for swinging about a horizontal axis from a collapsed position virtually parallel to the floor to an operative position extending angularly upwardly from the side wall; a second rectangular side wall hingedly attached to the header of the movable floor section for swinging about a horizontal axis from a collapsed position overlying and parallel to the floor to an operative position extending vertically upwardly therefrom; a second rectangular roof section hingedly attached adjacent its one longitudinal edge to the edge of said second side wall opposite the header-hinged edge for swinging about a horizontal axis from a collapsed position virtually parallel to the floor to an operative position extending angularly upwardly from the second side wall, each of said roof sections including laterally movable roof panels and means for selectively locking said roof panels in collapsed compact relation or in extended operative position; and means for connecting the distal edges of the roof sections together and for maintaining said side walls in vertical orientation.

References Cited in the file of this patent

UNITED STATES PATENTS

| | | |
|---|---|---|
| 410,783 | Chadd | Sept. 10, 1889 |
| 2,006,477 | Pendry | July 2, 1935 |
| 2,359,577 | Patrick | Oct. 3, 1944 |